United States Patent
Popeck

(10) Patent No.: US 8,933,838 B1
(45) Date of Patent: Jan. 13, 2015

(54) COMPLEMENTARY TRACKING LOOPS

(75) Inventor: Charles A. Popeck, Atkins, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 495 days.

(21) Appl. No.: 13/233,104

(22) Filed: Sep. 15, 2011

(51) Int. Cl.
*G01S 19/24* (2010.01)
*G01S 19/29* (2010.01)
*G01S 19/30* (2010.01)

(52) U.S. Cl.
CPC .............. *G01S 19/246* (2013.01); *G01S 19/30* (2013.01); *G01S 19/29* (2013.01)
USPC ............ 342/357.63; 342/357.68; 342/357.69

(58) Field of Classification Search
CPC ......... G01S 19/24; G01S 19/30; G01S 19/29; G01S 19/246
USPC .......................... 342/357.63, 357.68, 357.69
See application file for complete search history.

(56) References Cited

U.S. PATENT DOCUMENTS

| | | | |
|---|---|---|---|
| 5,703,597 A * | 12/1997 | Yu et al. | 342/357.65 |
| 6,836,241 B2 * | 12/2004 | Stone et al. | 342/357.63 |
| 7,057,554 B2 * | 6/2006 | McBurney | 342/357.64 |
| 7,639,180 B2 * | 12/2009 | Falk et al. | 342/357.77 |
| 7,663,541 B2 * | 2/2010 | Klinghult et al. | 342/357.29 |
| 8,593,343 B2 * | 11/2013 | Waters et al. | 342/357.62 |
| 2002/0039381 A1 * | 4/2002 | Dooley et al. | 375/147 |
| 2005/0018795 A1 * | 1/2005 | Studenny et al. | 375/343 |
| 2005/0041724 A1 * | 2/2005 | Chansarkar | 375/149 |
| 2006/0097914 A1 * | 5/2006 | Rao et al. | 342/357.12 |
| 2009/0262020 A1 * | 10/2009 | Kimura | 342/357.12 |

* cited by examiner

Primary Examiner — Gregory C Issing
(74) Attorney, Agent, or Firm — Angel N. Gerdzhikov; Donna P. Suchy; Daniel M. Barbieri

(57) ABSTRACT

A global navigation satellite system configured to operate in a noisy environment receives the same satellite signals in two separate channels. Each channel processes the signals independently according to different filtering constraints; one channel applies narrow filtering constraints while the other channel applies broader filtering constraints. Narrow filtering constraints allow the receiver to acquire a usable signal under certain conditions but not while moving rapidly. Broader filtering constraints allow the receiver to acquire a usable signal during rapid movement, but cannot overcome intense interference. A device implementing both constraint options is usable under a wider range of situations.

16 Claims, 6 Drawing Sheets

COMPLEMENTARY TRACKING LOOPS

FIELD OF THE INVENTION

The present invention is directed generally toward global navigation satellite systems, and particularly toward a system and method for overcoming noise.

BACKGROUND OF THE INVENTION

Global navigation satellite systems (GNSS) such as the Global Positioning System (GPS), the Compass navigation system, the Galileo positioning system and GLONASS all operate on the principle of trilateration based on signals received from satellites in each system. Each system generally functions by measuring some time shift in the signal received from each satellite. The time shift is a measure of the distance each signal traveled to reach the receiver. A computer in the receiver uses the known position of each satellite in orbit and the calculated distance from each satellite to determine the only location where the receiver could be located.

Measuring the time shift for each signal requires a high degree of precision; even a very small error can result in a calculated distance hundreds of meters from the receiver's actual location. Precise time shift measurements require the best possible signal from each satellite. Satellite signals are often degraded by interference. Interference may be caused by active signal jamming or simple noise such as from other electromagnetic devices or quick receiver antenna movement. GNSS signals are generally digital.

Interference may be reduced by spreading each signal over a wide frequency range, and by including filters to remove noise. Filters must be tuned for particular situations to be effective. A very narrow filter may provide a high quality signal, but may also filter out the signal completely in a noisy environment such as when the receiver is moving. A broad filter may provide a reasonable quality signal in a dynamic environment, but may not be able to filter out intense interference in a narrow frequency band.

Consequently, it would be advantageous if a method and apparatus existed that are suitable for increasing availability of a global navigation satellite system in a dynamic environment and in an environment of intense interference.

SUMMARY OF THE INVENTION

Accordingly, the present invention is directed to a novel method and apparatus for increasing availability of a global navigation satellite system in a noisy environment and in an environment of intense, narrow frequency interference.

One embodiment of the present invention is a GNSS device configured to process the same signal in two or more separate channels. In one channel, the receiver applies a filter having broad constraints to produce a usable signal in a lower interference but dynamic environment. In the other channel, the receiver applies a filter having narrow constraints to produce a usable signal in an environment of higher interference, but low intensity dynamics.

Another embodiment of the present invention is a GNSS device configured to dynamically determine separate filtering constraints for a signal, processed in two separate channels, to produce usable signals in a noisy environment. In each channel, the receiver may modify the filtering constraints dynamically to maximize the signal lock of each channel while maintaining a predetermined or dynamically determined divergence of the filtering constraints in each channel.

Another embodiment of the present invention is a method for producing a usable GNSS signal in environments of differing noise intensity by receiving one signal in two separate channels, each channel applying different filtering constraints, and determining which channel provides superior signal lock in each environment. The different filtering constraint may be determined dynamically.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
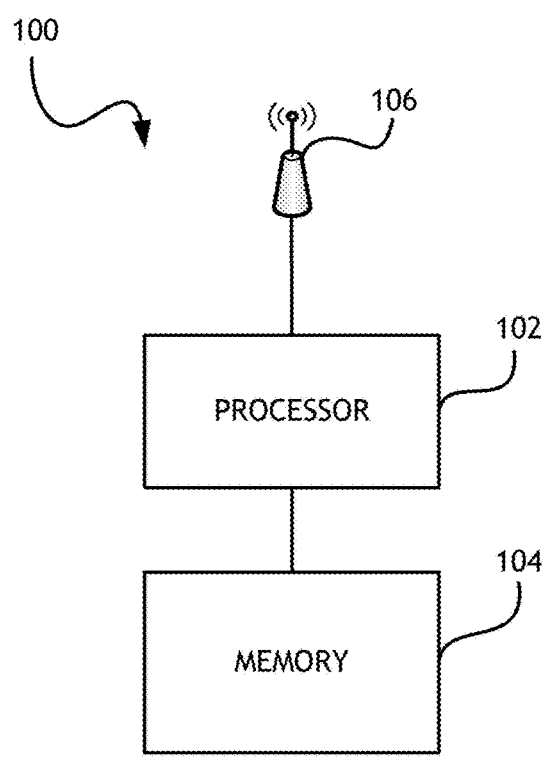
FIG. 1 shows a block diagram of a GNSS device.

Referring to FIG. 1, a block diagram of a GNSS device 100 is shown. The GNSS device 100 may include a receiver 106 for receiving one or more GNSS signals in two or more channels, the receiver 106 connected to a processor 102 executing computer code to process the one or more GNSS signals to determine the global location of the receiver. Although trilateration is possible with as few as three GNSS signals, GNSS devices 100 generally require four GNSS signals to ensure a desired degree of accuracy. A GNSS device 100 may also include memory 104 to store computer code and data necessary to process the one or more GNSS signals. It will be appreciated that GNSS signals may comprise GNSS like signals, transmitted from a terrestrial source rather than a satellite source.

Figure 2:
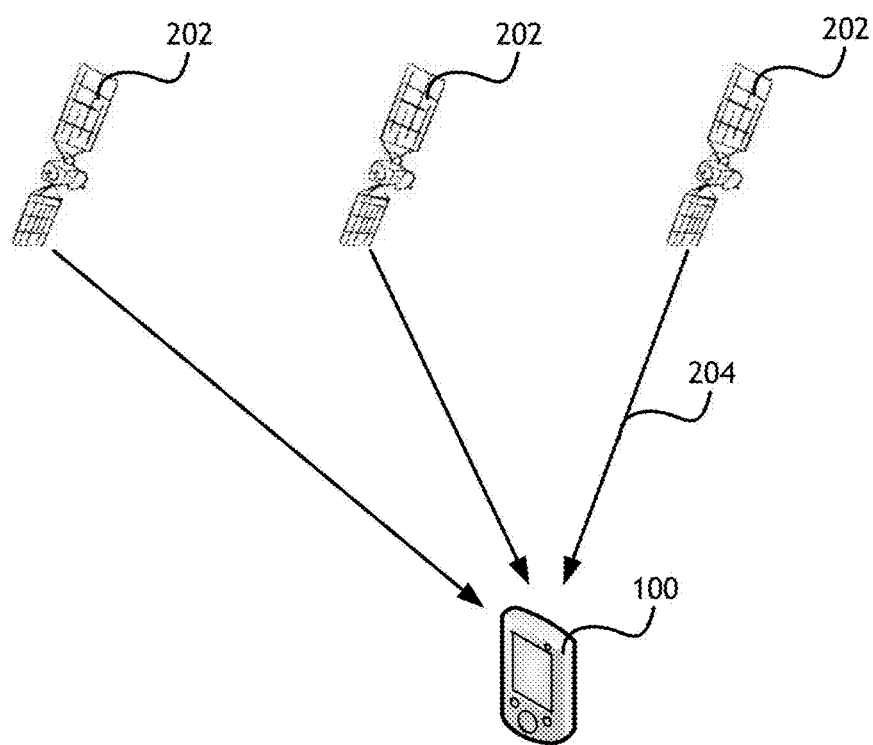
FIG. 2 shows a block diagram of a GNSS constellation and GNSS device.

Referring to FIG. 2, every GNSS consists of a constellation of satellites 202, each satellite transmitting a signal 204. A GNSS device 100 configured to operate with the particular GNSS receives signals 204 from available satellites 202 and determines its own location based on information contained in and derived from the signals 204. Each signal 204 from each satellite 202 may contain at least the position of the satellite 202 and the intrinsic clock bias of the satellite 202. With that information, the GNSS device 100 may derive the transmission time of each signal 204, and thereby calculate the location of the GNSS device relative to each satellite 202. It will be appreciated that GNSS signals may comprise signals from multiple GNSS systems.

Figure 3:
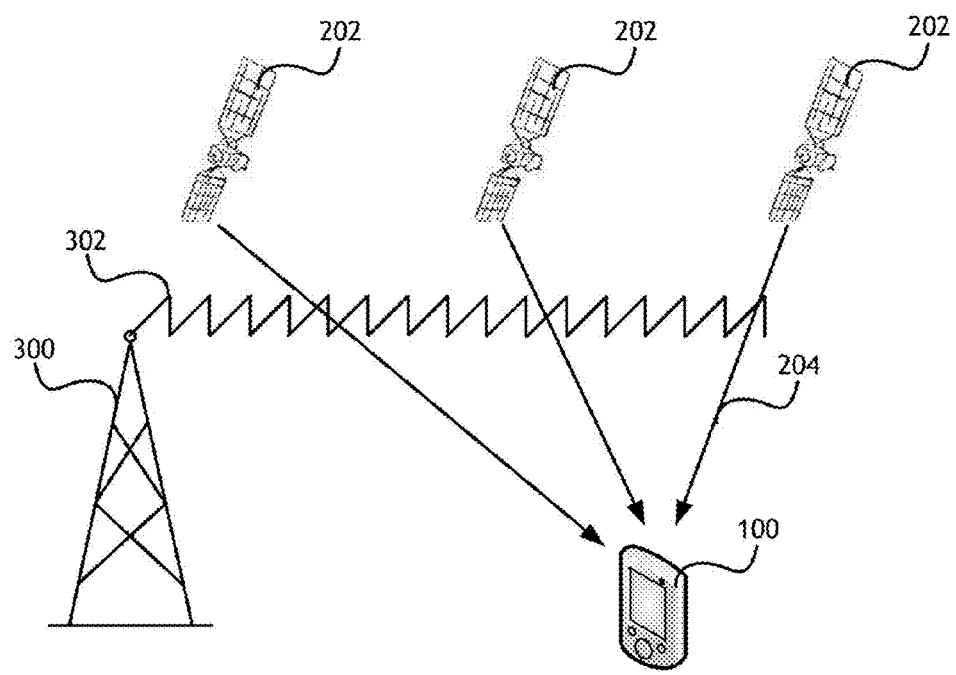
FIG. 3 shows a block diagram of a GNSS encountering interference.

Referring to FIG. 3, an interference source 300 may broadcast an interfering signal 302 in a frequency channel used by one or more of the satellites 202. Satellites 202 may broadcast signals 204 using some multiple access mechanism such as code division multiple access (CDMA) or frequency division multiple access (FDMA) to multiplex multiple signals over the same physical channel. In systems using CDMA for multiple access, interference in a frequency channel used by more than one satellite 202 in the GNSS can be especially problematic. To combat potential interference, signals 204 are broadcast over a wide frequency spectrum. Whether or not interfering signals 302 just degrade or fully deny the ability of a GNSS device 100 to acquire and track depends on several factors, including strength of the interfering signal 302, strength of the received signal 204, antenna gain of the interfering signal 302, antenna gain of the GNSS device 100, distance between the GNSS device 100 and the interfering signal source 300, etc. Assuming the strength of the interfering signals 302 is enough to degrade the desired signals (but not totally deny operation), a GNSS device 100 according to the present invention can mitigate the interference.

Where an interfering signal 302 is intense, a GNSS device 100 may impose narrow filtering constraints (narrow bandwidth) on the channel receiving the GNSS signals 204. Narrow filtering constraints may provide a tracking signal in interference levels up to, for example, 51 dB J/s, but the signal may only be usable for low user dynamics (such as near-stationary conditions).

Where an interfering signal 302 is a low intensity signal, the GNSS device 100 may impose broad filtering constraints (broad bandwidth) on the channel receiving the GNSS signals 204. Broad filtering constraints may provide a tracking signal in interference levels up to, for example, 41 dB J/s, but the signal may be usable for extensive user dynamics (such as fast movement). Broad filtering constraints are not useful for a high intensity interfering signal 302 because the interfering signal 302 may not be filtered out by the broad bandwidth filtering constraints.

Figure 4:
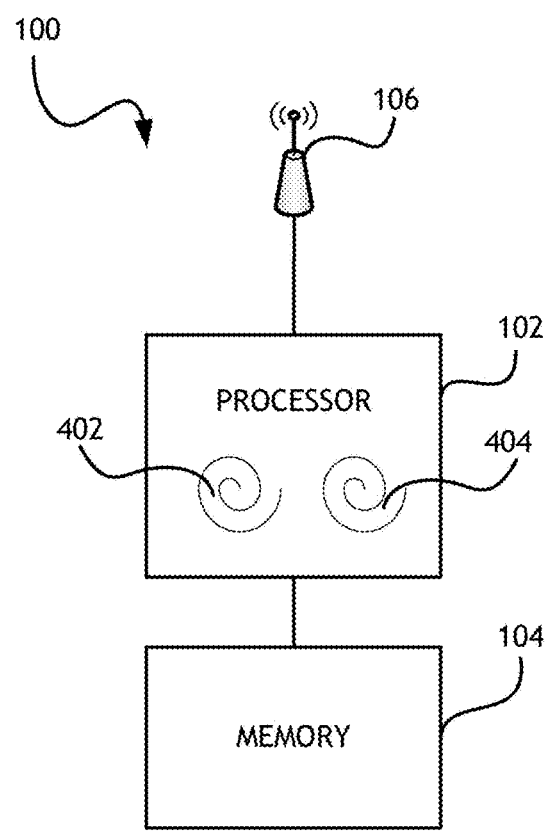
FIG. 4 shows a block diagram of a GNSS device processing a signal by two independent filtering constraints.

Referring to FIG. 4, a GNSS device 100 may include two separate channels 402, 404 for processing the same GNSS signals 204 with two different filtering constraints. The GNSS device 100 may receive one or more GNSS signals 204 in a first channel 402. The first channel 402 may filter the GNSS signals according to narrow filtering constraints. The GNSS device 100 may also receive the same GNSS signals 204 in a second channel 404. The second channel may filter the GNSS signals 204 according to broad filtering constraints. The processor 102 may then determine which channel 402, 404 is producing usable GNSS signals 204. The processor 102 may then use the usable GNSS signals 204 to determine its location.

For example, a first channel 402 may filter the GNSS signal 204 on very narrow bandwidths. Very narrow bandwidth filtering would be expected to overcome interference up to 50 dB J/s while the GNSS device 100 is stationary or moving only very slowly, but would be expected to produce an unusable signal when the GNSS device 100 is moving rapidly, such as in a vehicle. A second channel 404 may filter the GNSS signal 204 on wider bandwidths. Wider bandwidth filtering would be expected to overcome interference up to about 41 dB J/s, even when the GNSS device is moving quickly.

Alternatively, the processor 102 may determine filtering constraints for each channel 402, 404 dynamically based on user input or other criteria such as a persistent background noise level. The processor 102 may maintain statistical data in memory 104 concerning which channel 402, 404 produces a usable GNSS signal 204 more often and modify the filtering constraints of the other channel accordingly while continuing to maintain some minimum differentiation in filtering constraints for each channel. For example, if the processor 102 determines that the second channel 404 produces a usable GNSS signal 204 roughly 75% of the time with wider bandwidth, and the first channel 402 never produces a usable GNSS signal 204 with very narrow bandwidth constraints, the process may modify the filtering constraints of the first channel 402 to a narrow bandwidth somewhere between the very narrow and wider bandwidth constraints. One skilled in the art will appreciate that specific bandwidth filtering constraints may be particular to each situation.

One skilled in the art will appreciate that, while the GNSS device 100 described herein may process a single GNSS signal 204 in separate channels to apply two separate filtering constraints, a GNSS device 100 requires more than one GNSS signal 204 to function. One embodiment of the present invention may include multiple methods, substantially as set forth herein, to produce a plurality of GNSS signals 204 for use by a GNSS device 100.

Figure 5:
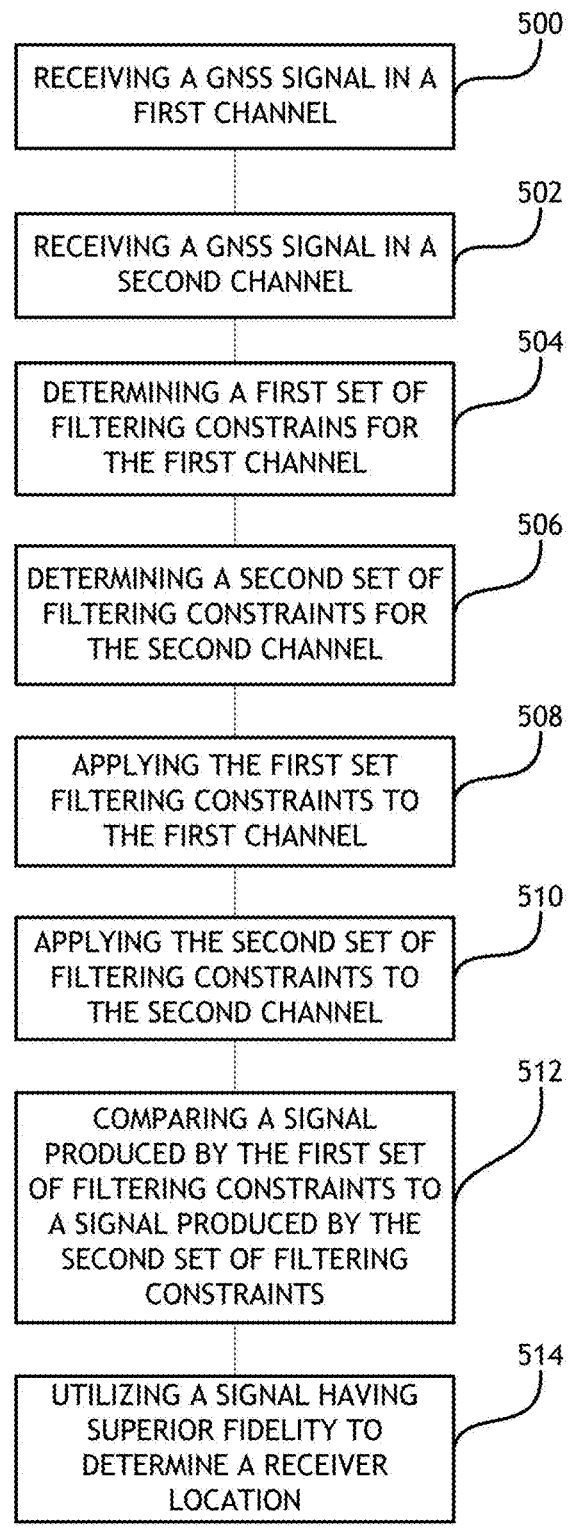
FIG. 5 shows a flowchart of a method for producing a usable signal in a GNSS under different noise conditions.

Referring to FIG. 5, a flowchart is shown for filtering the same GNSS signals 204 in two or more different channels 402, 404, according to different filtering constraints. A GNSS device 100 may receive 500 a GNSS signal 204 in a first channel 402. The GNSS device 100 may simultaneously receive 502 the same GNSS signal 204 in a second channel 404. The GNSS device 100 may then determine 504 a first set of filtering constraints for the first channel. The first set of filtering constraints may be predefined, based on user input, or based on some analysis of the GNSS signal 204. Likewise, the GNSS device 100 may determine 506 a second set of filtering constraints for the second channel. The second set of filtering constraints may be predefined, based on user input, or based on some analysis of the GNSS signal 204. The first set of filtering constraints and the second set of filtering constraints may be tuned to produce a usable GNSS signal 204 in environments of different background noise and interference. The GNSS device 100 may then apply 508 the first set of filtering constraints to the first channel, and apply 510 the second set of filtering constraints to the second channel. Each channel may produce a filtered GNSS signal 204. The GNSS device 100 may then compare 512 the signal produced by the first set of filtering constraints to the signal produced by the second set of filtering constraints to determine which set of filtering constraints produced a usable GNSS signal 204. A usable GNSS signal 204 is a signal that the GNSS device 100 can use to determine its location. The GNSS device 100 may then utilize whichever signal the GNSS device 100 determines is usable.

One skilled in the art will appreciate that, while the methods set forth herein describe processing a single GNSS signal 204 in separate channels to apply two separate filtering constraints, a GNSS device 100 requires more than one GNSS signal 204 to function. One embodiment of the present invention may include multiple methods, substantially as set forth herein, to produce a plurality of GNSS signals 204 for use by a GNSS device 100.

Figure 6:
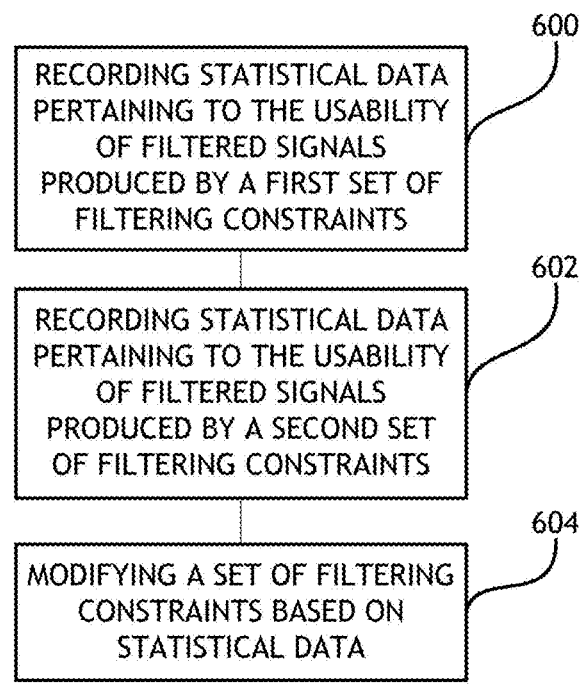
FIG. 6 shows a flowchart of a method for tracking the performance of different filtering constraints to determine comparative performance of each set of constraints.

Referring to FIG. 6, a GNSS device 100 implementing the method of the present invention may record 600 statistical data pertaining to the usability of filtered signals produced by the first set of filtering constraints, and record 602 statistical data pertaining to the usability of filtered signals produced by the second set of filtering constraints. The GNSS device may then modify 604 either the first set of filtering constraints or the second set of filtering constraints based on the statistical data to improve the overall ability of the GNSS device 100 to determine its own location. The first set of filtering constraints and the second set of filtering constraints should always be tuned to produce a usable signal in different noise environments. Ideally, the first set of filtering constraints should be tuned to produce a usable signal whenever the second set of filtering constraints fails to produce a usable signal. It will be appreciated that whenever the second set of filtering constraints fails to produce a usable signal, the statistical data and signal tracking phase pertaining to the first set of filtering constants can assist with the rapid reestablishment of track using a retuned second set of filtering constraints.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A apparatus for producing a usable GNSS signal comprising:
    a receiver having two or more channels;
    a processor connected to the receiver;
    memory connected to the processor; and
    computer code stored in the memory,
    wherein the computer code is configured to:
        apply a first set of filtering constraints to a first GNSS signal in a first channel;
        apply a second set of filtering constraints to the first GNSS signal in a second channel, wherein the second set of filtering constraints are broader then the first set of filtering constraints;
        maintain, in the memory, statistical data pertaining to the percentage of time the first set of filtering constraints produce a usable signal and the percentage of time the second set of filtering constraints produce a usable signal; and
        dynamically determine the first set of filtering constraints based on the statistical data.

2. The apparatus of claim 1, wherein the computer code is further configured to dynamically determine the first set of filtering constraints.

3. The apparatus of claim 1, wherein the computer code is further configured to dynamically determine the second set of filtering constraints.

4. The apparatus of claim 1, wherein the first set of filtering constraints is configured to filter out interference up to 50 dB J/s.

5. The apparatus of claim 1, wherein the second set of filtering constraints is configured to filter out interference caused by movement during high user dynamics.

6. The apparatus of claim 1, wherein the computer code is further configured to compare a first filtered signal produced by the first set of filtering constraints to a second filtered signal produced by the second set of filtering constraints.

7. The apparatus of claim 1, wherein the computer code is further configured to dynamically determine the second set of filtering constraints based on the statistical data.

8. A method for producing a usable GNSS signal comprising:
    receiving, by a computer processor, a GNSS signal in a first channel;
    receiving, by the computer processor, the GNSS signal in a second channel;
    applying, by the computer processor, a first set of filtering constraints to the first channel;
    applying, by the computer processor, a second set of filtering constraints to the second channel;
    comparing, by the computer processor, a first filtered signal produced by the first set of filtering constraints to a second filtered signal produced by the second set of filtering constraints;
    recording statistical data pertaining to the percentage of time the first set of filtering constraints produce a usable signal and the percentage of time the second set of filtering constraints produce a usable signal; and
    modifying one of the first set of filtering constraints and the second set of filtering constraints based on the statistical data.

9. The method of claim 8, further comprising determining the first set of filtering constraints for the first channel.

10. The method of claim 8, further comprising determining the second set of filtering constraints for the second channel.

11. The method of claim 8, wherein the first set of filtering constraints is configured to produce a usable signal in an environment having interference up to 50 dB J/s.

12. The method of claim 8, wherein the second set of filtering constraints is configured to produce a usable signal during high user dynamics.

13. The method of claim 8, wherein the GNSS signal comprises a terrestrial signal.

14. The method of claim 8, wherein the GNSS signal comprises a satellite signal.

15. A method for producing a usable GNSS signal comprising:
    receiving, by a computer processor, a GNSS signal in a first channel;
    receiving, by the computer processor, the GNSS signal in a second channel;
    applying, by the computer processor, a first set of filtering constraints to the first channel;
    applying, by the computer processor, a second set of filtering constraints to the second channel;
    recording, by the computer processor, statistical data pertaining to the percentage of time the first set of filtering constraints produce a usable signal and the percentage of time the second set of filtering constraints produce a usable signal; and
    modifying, by the computer processor, one of the first set of filtering constraints and the second set of filtering constraints based on the statistical data,
    wherein:
        the first set of filtering constraints are tuned to produce a usable GNSS signal in an environment having interference up to 50 dB J/s while a GNSS device is stationary; and
        the second set of filtering constraints are tuned to produce a usable GNSS signal in an environment having interference up to 41 dB J/s while the GNSS device is moving.

16. The method of claim 15, further comprising recording statistical data pertaining to the percentage of time the first set of filtering constraints produce a usable signal and the percentage of time the second set of filtering constraints produce a usable signal.

\* \* \* \* \*